No. 735,248. PATENTED AUG. 4, 1903.
J. HAHN.
PUMP PISTON.
APPLICATION FILED JAN. 20, 1902.
NO MODEL.
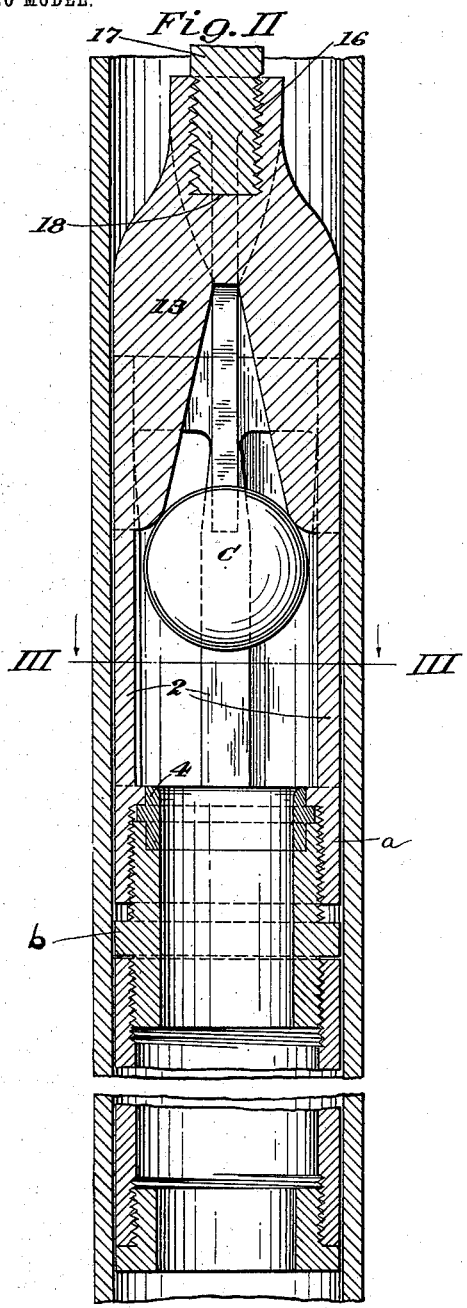
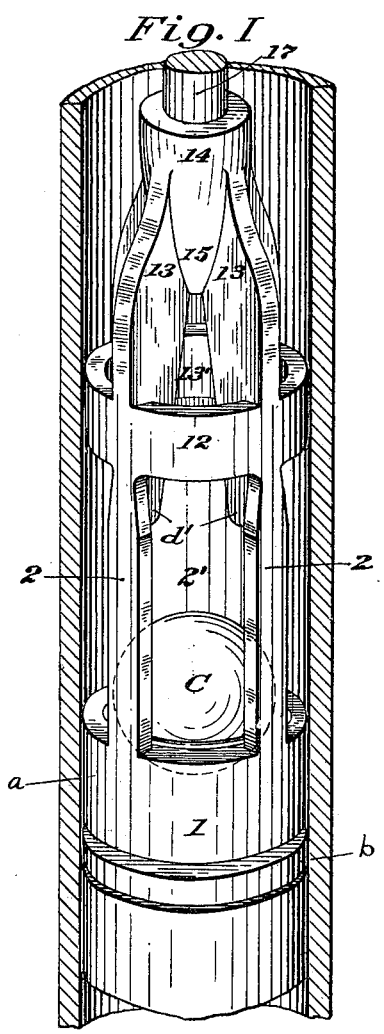
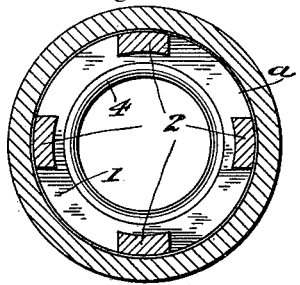
Witnesses
Inventor
John Hahn No. 735,248.

Patented August 4, 1903.

UNITED STATES PATENT OFFICE.

JOHN HAHN, OF LOS ANGELES, CALIFORNIA.

PUMP-PISTON.

SPECIFICATION forming part of Letters Patent No. 735,248, dated August 4, 1903.

Application filed January 20, 1902. Serial No. 90,530. (No model.)

*To all whom it may concern:*

Be it known that I, JOHN HAHN, a citizen of the United States, residing in Los Angeles, county of Los Angeles, State of California, have invented certain new and useful Improvements in Pump-Pistons, of which the following is a specification.

This invention relates to pump-pistons, and particularly to pistons applicable for use for deep-well pumps, and has for its object the provision of a pump-piston which shall be particularly adapted for use in deep wells and which will pump oil and water mixed with sand and other solids with ease and effectiveness and which will not clog or become stuck.

Another object is to provide a valve-cage which will give maximum freedom to the oil and will not be liable to be broken or jammed—that is to say, I propose to secure the necessary strength for the valve-cage with as little obstruction as possible to the passage of oil around the valve.

Another object is to quickly and surely seat the valve at the upstroke of the piston, and in attaining this object I furnish the upper end of the cage with liquid-passages adapted to direct the liquid directly upon the top of the valve.

Another object is to provide such a pump-piston of most simple and durable construction which will be cheap to manufacture and which shall be extremely positive and efficient in operation.

With these and such other objects and ends in view as hereinafter appear my invention consists generally in a pump-piston comprising a valve and a cage therefor, the cage being provided at its upper end with a series of openings at its top adapted to direct the current of liquid in toward the center of the cage over the top of the valve when the cage is started on the upstroke.

More specifically, the invention consists in a pump-piston comprising a valve and a cage therefor, the cage provided at its upper end with arms, and a ring joining the arms at the lower ends to form openings through the top of the cage, and, further, in providing stops below the ring for stopping the upward movement of the valve.

The invention consists, further, in the provision of means adapted upon the upstroke of the piston to break the force of fluid upon the sides of the valve, thereby accelerating the seating of the valve.

The invention consists, further, in constructions and in general and specific combinations of parts hereinafter described, and particularly pointed out in the claims, and will be more readily understood by reference to the accompanying drawings, forming part of this specification, and in which—

Figure I is a perspective view of a pump-piston embodying my invention. Fig. II is a longitudinal sectional view thereof, the ball-valve being shown in its elevated position. Fig. III is a sectional plan view on the line III III of Fig. II.

As shown in the drawings, the top section $a$ of the plunger 1 may be furnished with upward extensions or standards 2, a central chamber being formed within these standards, and from this chamber the openings or slots 2' extend between the respective standards, as shown. The standards 2 are connected together at their upper ends by the ring 12, preferably integral therewith.

14 represents the top or head of the pump-piston, being preferably formed integral with the ring 12 and standard 2 being connected with the ring 12 by ribs or arms 13, liquid-passages 13' being formed between the several arms, and the head 14 being preferably sloped inward underneath, as indicated at 15, to allow a free passage for liquid in either direction.

The arms 13 are preferably carried down below the ring and form stops or shoulders $d'$ for appropriately stopping the valve C to allow the liquid to act on the top of the valve to positively seat the valve when the piston moves upward, as hereinafter more fully set forth.

A renewable valve-seat 4 of any ordinary or preferred construction is held in the lower end of the plunger top section $a$ by the lower section $b$, as shown. Upon this seat the ball-valve C is adapted to be seated when the piston moves upward.

Preferably the pump-piston has a screw-threaded socket 16 in its top to receive the pump-rod 17 and has a stop 18, against which the pump-rod may jam to act as a set-nut, thus to prevent the piston unscrewing.

In practical operation the downstroke of the piston in a liquid will cause the valve to be upborne by the liquid, the plunger passing down through the liquid, which flows freely through the valve-seat and around the valve and passes up on each side thereof. The liquid is forced outward by the valve-bottom against the valve-seat and will keep the seat free from any accumulation of sediment, so that on the return stroke the valve may seat truly. Upon the upstroke of the piston the liquid is directed by the passages 13' and the inwardly-sloping faces 15 into the center chamber directly upon the top of the valve. The liquid thus acts on the center of the valve, and at the same time all danger of any accumulation of sand or gas at the top of the cage is avoided. By this construction the capacity of the pump is increased, for the reason that the liquid has a freer upward flow and the valve a quicker action. On the downstroke of the piston the liquid passes freely upward around the valve and through the ring at all times, the stops being arranged to prevent the valve from rising far enough to interfere with the passage through the ring.

The open spaces between the upper and lower rings and the standards 2 and also the spaces between the center piece 14 and upper ring 12 and arms 13 afford the requisite way for the oil to flow around the valve when the same is stopped by the stops $d'$ below the ring 12, with open spaces between it and the upper ring. The ring 12 being located below the center piece 14 and, in combination with the arms 13, forming openings or passage-ways through which the liquid is forced or deflected inwardly by the upward movement of the ring 12 at the beginning of the upstroke of the piston, this current of liquid thus forced inward through the opening between the arms 13 and the ring 12 is directed thereby toward the center of the valve-cage directly on top of the valve, which is at all times held below the ring 12 by means of the stops $d'$.

I have shown the arms 13 as extended inward and below the ring 12 and terminating in shoulders or stops $d'$ $d'$. These shoulders or stops prevent the valve from rising up to the ring and when the plunger is descending and the liquid is passing upward through the valve-cage the valve is carried upward and is stopped by the shoulders $d'$ $d'$. On the reversal of the stroke the liquid is directed through the opening formed between the arms 13 and the ring 12 and forces the valve back onto its seat 4, the pressure being uniform and from all directions downward and inward onto the top of the valve to seat the same squarely upon the seat, thereby avoiding the liability of jamming or bruising one side of the seat, as often occurs in any valve subject to variation of the directions from which the pressure is applied to the valve to seat it. I find that by thus seating my valve the valve-seat wears for a longer time than where the valve is not acted upon uniformly, as stated, to force it back into its seat.

The ring 12 not only serves to direct the fluid in toward the center of the piston, but serves to break the direct force of fluid upon the edges of the valve-seat, thus enabling the valve to more readily seat itself.

Having thus fully described my invention, I claim—

1. In a pump-piston, a valve and a cage therefor having two rings, standards and open spaces between said rings, a center piece above the upper ring, arms and open spaces between the center piece and upper ring, a valve-seat in the lower ring and a stop to stop the valve below the upper ends of the first-named open space.

2. In a pump-piston, a valve and a cage therefor, the cage being provided at its upper end with arms and a ring joining the arms at the lower ends to form in combination, openings through the top of the cage, and stops below the ring for stopping the upward movement of the valve.

3. In a pump-piston, a valve, a valve-seat, and a cage for said valve, means arranged at the top of the cage above the limit of upward play of the valve to direct the downward current of liquid upon the extreme upper portion of said valve to positively seat the same upon the upstroke of said piston.

4. In a pump-piston, a valve and a valve-seat, a cage for said valve, said cage provided with stops limiting the upward movement of the valve and with means arranged above the said stops to direct the liquid inward toward the center of said valve and upon the top thereof.

5. In a pump-piston, a valve and a valve-seat, a cage for said valve, said cage divided into two portions, means for limiting the upward play of the valve within the lower portion, means at the upper portion for directing the fluid inward toward the center of said valve and upon the top thereof upon the upstroke of the piston to positively seat said valve.

6. In a pump-piston, a valve and a valve-seat therefor, a cage for said valve extending above said valve-seat and provided with a central chamber and a plurality of passages or slots in its sides, means dividing said passages or slots into two sections and means in connection with said dividing means for directing the fluid, upon the upstroke of the piston, inward into said chamber and upon the top of said valve to positively seat the same.

7. In a pump-piston, a valve and a valve-seat therefor, a cage for said valve extending above said valve-seat and provided with a central chamber and a plurality of passages or slots in its sides, means dividing said passages or slots into two sections and means in connection with said dividing means for directing the fluid, upon the upstroke of the piston, inward into said chamber and upon the top of said valve to positively seat the same, and means for limiting the upward play of said valve.

8. In a pump-piston, a valve and a cage therefor, the cage provided at its upper end with arms and a ring joining the arms at the lower ends to form in combination, openings through the top of the cage, the head of said cage provided with inwardly-sloped portions between said respective arms.

9. In a pump-piston, a valve and a valve-seat, a cage for said valve extending above said valve-seat, means for limiting the upward play of the valve, and a ring arranged above said means, said ring having a series of openings through its top adapted to direct the downward current of liquid onto the top of said valve to positively seat the same on said seat upon the upstroke of said piston.

10. In a pump-piston, a cylindrical body comprising a lower and an upper ring, a valve-seat within said lower ring, said body provided with a series of openings from the top of said upper ring adapted to direct the downward current of liquid upon the top of the valve to positively seat the same upon the upstroke of the piston, and provided with side slots or openings between said upper and lower rings, means for limiting the upward play of the valve, and a valve adapted to operate within said body.

11. In a pump-piston, a valve and a valve-seat, a cage for said valve extending above said seat, means at the periphery and toward the top of said cage above the limit of play of said valve to break the direct force of the liquid upon the edges of the valve-seat upon the upstroke of the piston whereby said valve is enabled to readily truly seat itself.

12. In a pump-piston, a valve and a valve-seat, a cage for said valve extending above said seat, means at the periphery and toward the top of said cage above the limit of play of said valve to break the direct force of the liquid upon the edges of the valve-seat and direct the liquid upon the top of said valve to positively seat the same upon the upstroke of the piston.

In testimony whereof I have signed my name to this specification, in the presence of two subscribing witnesses, at Los Angeles, California, this 9th day of January, 1902.

JOHN HAHN.

Witnesses:
JAMES R. TOWNSEND,
E. A. WATERMAN.